W. P. PITT.
LOOSE LEAF HOLDER.
APPLICATION FILED FEB. 25, 1913.

1,088,177.

Patented Feb. 24, 1914.

4 SHEETS—SHEET 1.

WITNESSES:
R. E. Hamilton
E. B. House

INVENTOR.
William P. Pitt
BY Warren D. House
His ATTORNEY.

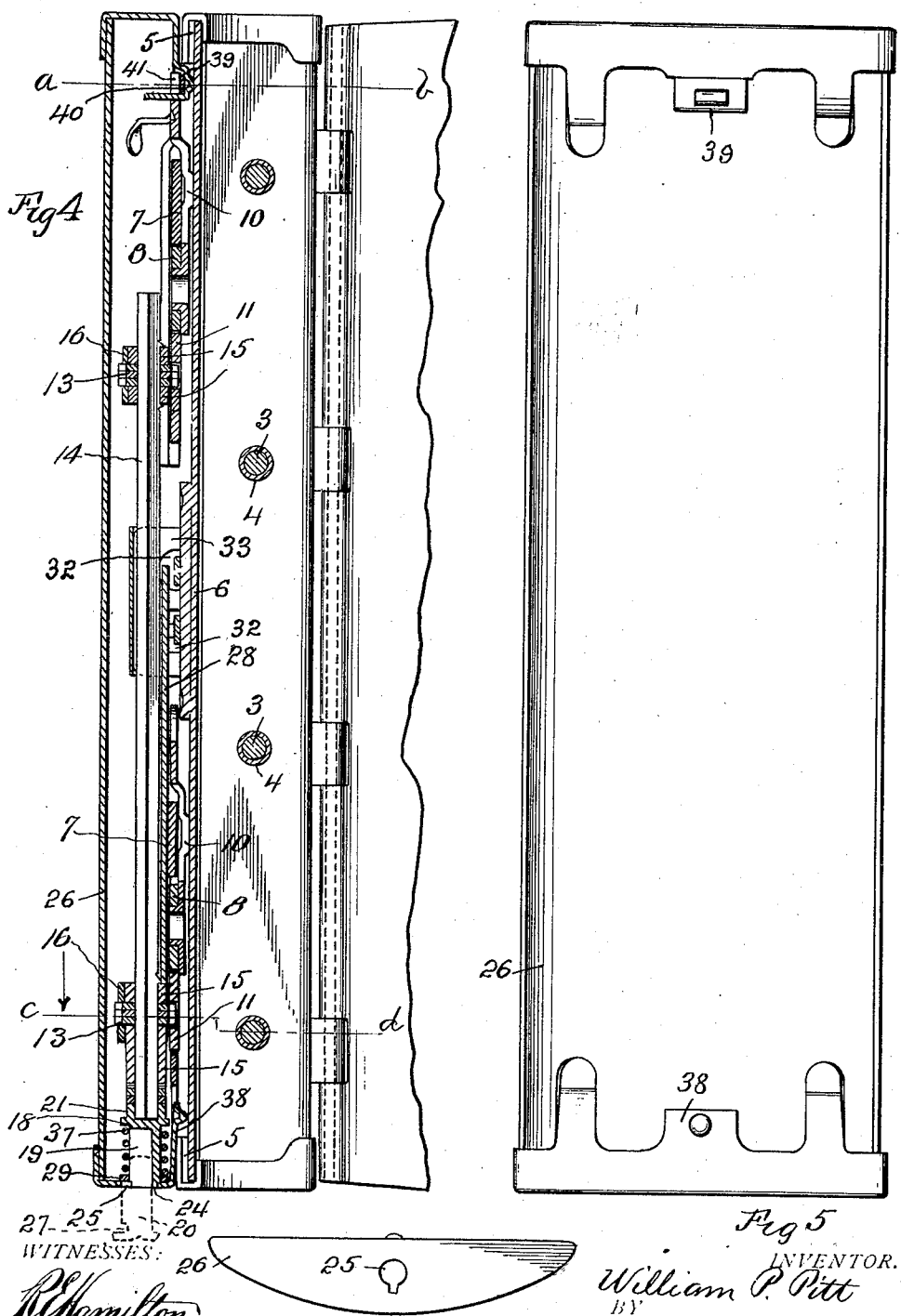

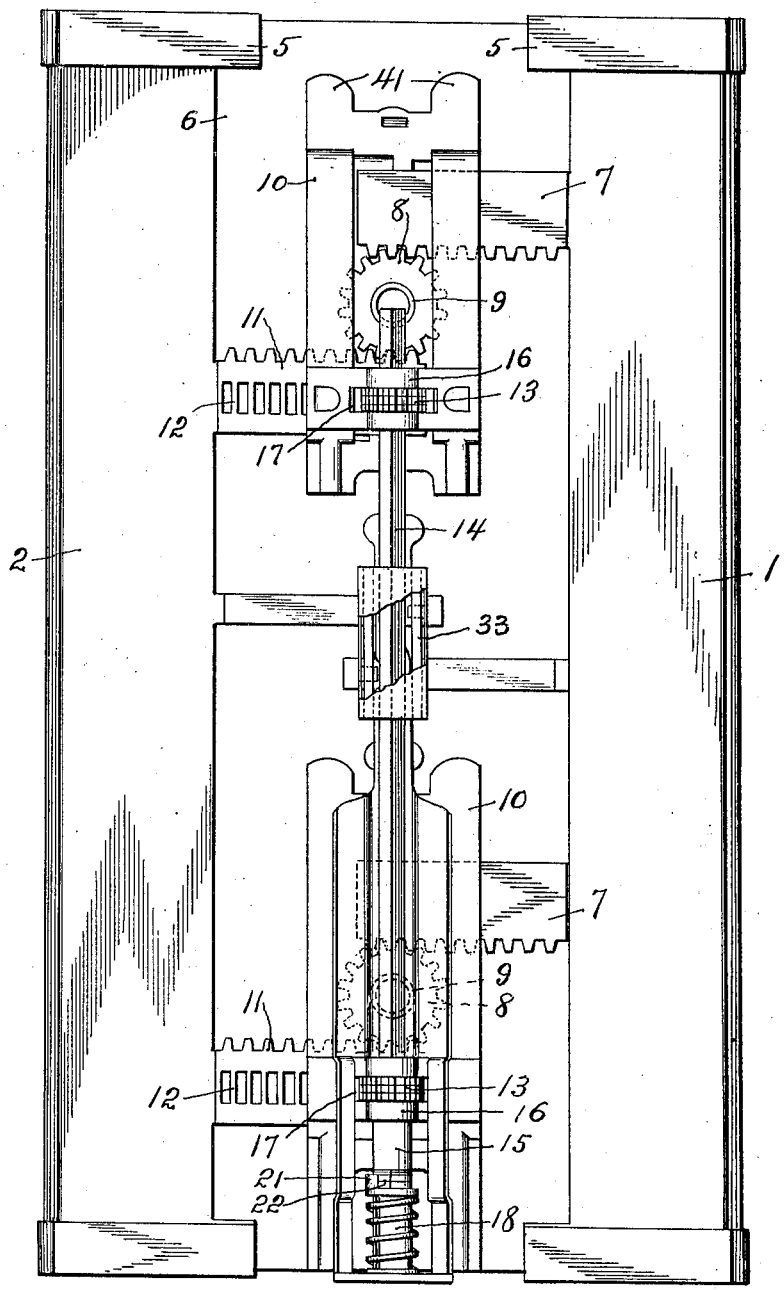

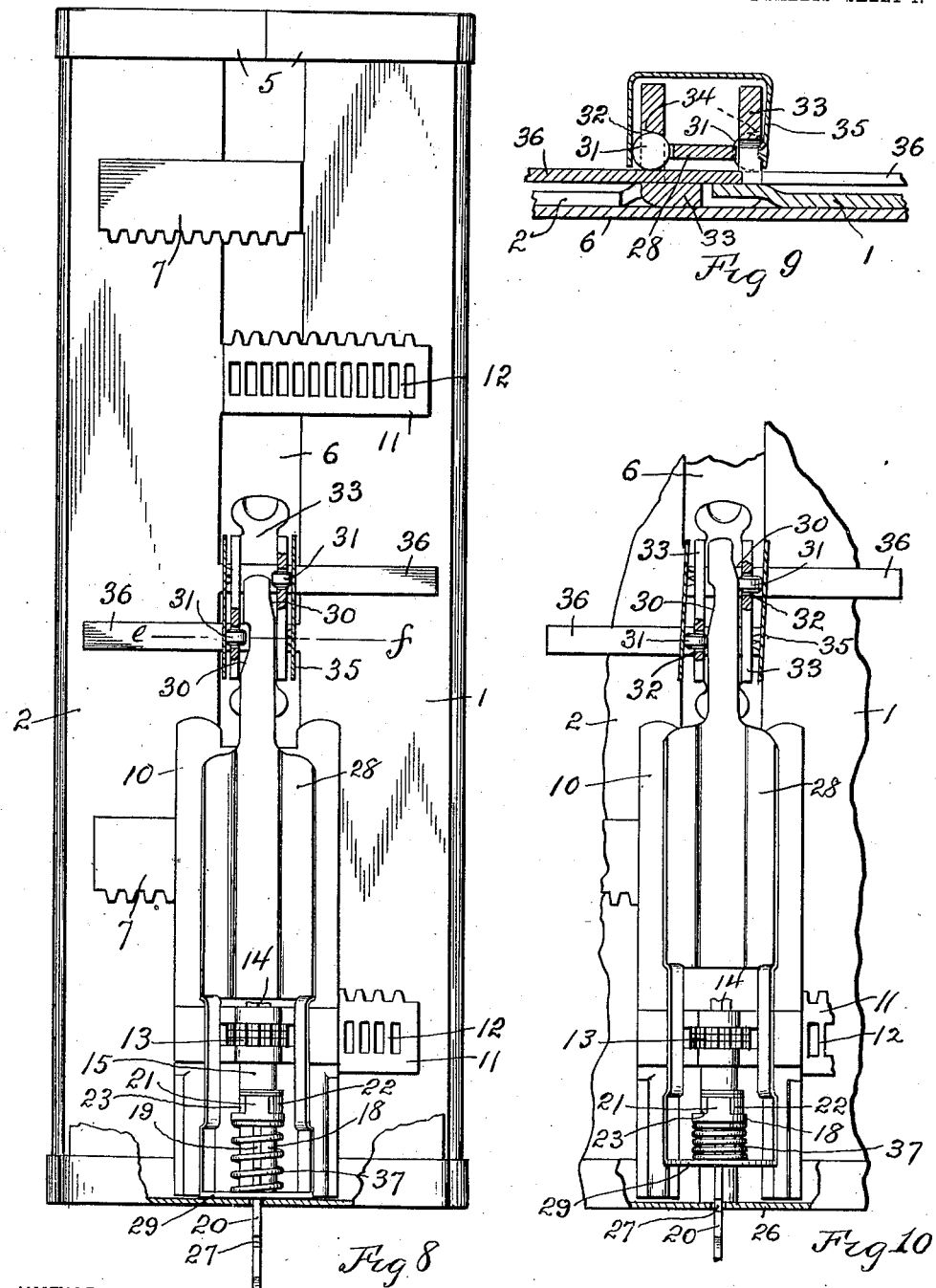

UNITED STATES PATENT OFFICE.

WILLIAM P. PITT, OF INDEPENDENCE, MISSOURI, ASSIGNOR TO IRVING-PITT MANUFACTURING COMPANY, OF KANSAS CITY, MISSOURI, A CORPORATION OF MISSOURI.

LOOSE-LEAF HOLDER.

1,088,177. Specification of Letters Patent. Patented Feb. 24, 1914.

Application filed February 25, 1913. Serial No. 750,482.

*To all whom it may concern:*

Be it known that I, WILLIAM P. PITT, a citizen of the United States, residing at Independence, in the county of Jackson and State of Missouri, have invented a certain new and useful Improvement in Loose-Leaf Holders, of which the following is a specification.

My invention relates to improvements in loose leaf holders.

It is particularly well adapted for use in connection with loose leaf ledgers.

One object of my invention is to provide a novel device of the character described, which may be quickly expanded or contracted for the purpose of adapting the device to hold different numbers of leaves.

A further object of my invention is to provide novel means by which the device may be quickly and easily expanded or contracted.

A further object of my invention is to provide novel locking means which will firmly hold the device from expanding, when desired, but which will permit its quick contraction to a position in which the parts will be in the smallest compass commensurate with the number of leaves held thereby.

A further object of my invention is to provide a construction composed principally of stamped sheet metal parts, in which the employment of all screws and pins, or rivets, is, preferably, dispensed with.

A further object of my invention is to provide a construction which affords cheapness of manufacture, durability, and non-liability of getting out of order.

A further object of my invention is to provide a construction which will be light in weight while having great strength.

Other novel features of my invention are hereinafter fully described and claimed.

Figure 1:
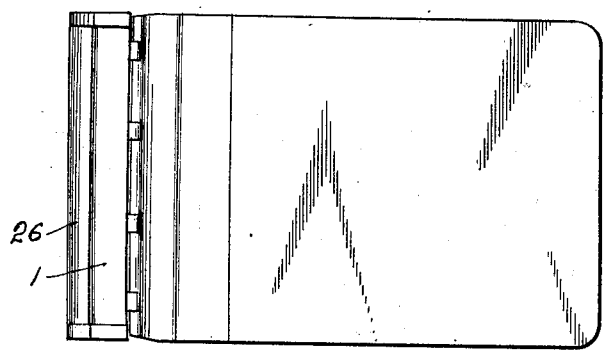
Figure 2:
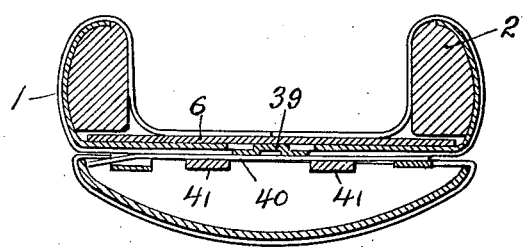
Figure 3:
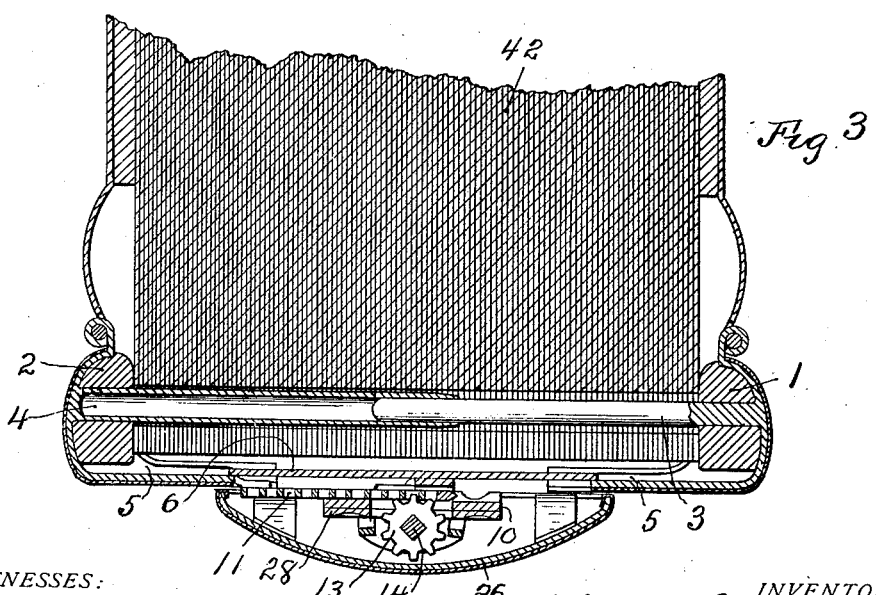

In the accompanying drawings which illustrate the preferred embodiment of my invention:—Figure 1 is a plan view of a ledger constructed in accordance with the principles of my invention. Fig. 2 is a cross section, on the line $a$—$b$ of Fig. 4. Fig. 3 is a cross section, taken on the dotted line $c$—$d$ of Fig. 4, and showing the ledger filled with loose leaves. Fig. 4 is a longitudinal, central sectional view. Fig. 5 is an inside plan view of the detachable cover for the back. Fig. 6 is an end view of what is shown in Fig. 5. Fig. 7 is a plan view, looking toward the back of the holder, the back cover being removed, some of the parts being broken away, and the holder shown in the expanded position. Fig. 8 is a plan view looking at the back of the holder, which is shown in the contracted position, some of the parts being removed, some broken away, and some in section, the key being shown inserted but not in the operative position. Fig. 9 is a cross section enlarged, on the line $e$—$f$ of Fig. 8. Fig. 10 is a view similar to Fig. 8, some of the parts being broken away and the key shown inserted in operative position.

Similar reference characters designate similar parts in the different views.

1 and 2 designate respectively, two leaf holding members, which are movable toward and from each other, the member 1, having secured to it transverse leaf supporting posts 3, which are slidably mounted in transverse leaf supporting tubes 4, on the member 2.

As shown in Fig. 3, the members 1 and 2, at their ends, are each provided with transverse grooved portions 5, in which is slidably fitted a flat, relatively stationary plate 6, which serves as a back.

For moving the members 1 and 2, apart, the following described mechanism is preferably employed:—Secured to the member 1 and extending toward the member 2, are two rack members 7, which respectively mesh with pinions 8, which are respectively mounted and rotatable on two tubular projections 9, provided respectively on two relatively flat plates 10, which are secured to the back plate 6. The pinions 8 mesh respectively with two transverse racks 11, which are secured to the member 2. Said racks 11 are provided respectively with longitudinal rows of teeth 12, which respectively engage pinions 13, which are mounted on and rotatable with a longitudinal square bar 14, on which are mounted circular collars 15, shown in Fig. 4, which are rotatively mounted in bearing plates 16, secured upon the plates 10, said bearing plates having slots 17, as shown in Fig. 7, for receiving the pinions 13.

Rotatively mounted on the outer end of the square shaft 14, is a short cylindrical member 18, which, as shown in Fig. 8, is provided with a longitudinal key slot 19, adapted to receive the flat shank of a key 20, by means of which the member 18 is turned, as will be hereinafter described.

The inner end of the member 18 is provided with an inwardly extending projection 21, which is adapted to contact with a radial projection 22, provided on a collar 23, which is mounted on and rotatable with the shaft 14. The outer end of the member 18, as shown in Fig. 4, has a shouldered portion 24, which is adapted to fit into a key-hole 25, provided in the adjacent end of a detachable cover member 26, best shown in Figs. 5 and 6.

The key 20 is provided with a notch 27, in one edge, adapted, when the key is forced into the position shown in Fig. 10, to register with the adjacent transverse end of the cover member 26. When the key is in the position shown in Fig. 10, and is turned to the right, as viewed in said figure, it will turn the member 18, which, through the intermediacy of the projections, 21 and 22, will rotate the shaft 14, thereby rotating the pinions 13, which, by engagement with the teeth 12, of the racks 11, will force the member 2 outwardly. The movement outwardly of the racks 11 will turn the pinions 8 so as to simultaneously force outwardly the member 1, through the intermediacy of the racks 7.

The above expanding movement of the members 1 and 2, will take place, as above described, after the key 20 has been inserted and forced to the position shown in Fig. 10, at which time the mechanism which normally locks the members 1 and 2 against outward movement will have been released by the mechanism which I will now describe.

A longitudinally slidable plate 28, has at its outer end a transverse portion 29, which is provided with a circular hole in which is slidably mounted the member 18. Opposite edges of the plate 28, near its inner end, are provided with cam portions 30, as shown in Figs. 8 and 10, which are adapted to strike and force outwardly, when the plate 28 is forced inwardly by the key 20 to the position shown in Fig. 10, two roller wedges 31, which are mounted respectively in two slots 32, provided in the upstanding arms of a channel member 33, which is secured with its transverse portion flatwise against the outer side of the back plate 6, as shown in Figs. 8 and 10, and as is also shown in Figs. 4 and 7.

Each of the slots 32, which contain the rollers 31, is provided with an inclined surface 34, as shown in Fig. 9, which has normally bearing against it the adjacent locking roller 31. The rollers 31 are normally held in the locking position against the incline 34, by the two flanges of a channel shaped spring plate 35. The rollers 31 are adapted to respectively lockingly engage two plates 36, secured transversely to the members 1 and 2 respectively.

A coil spring 37, encircles the member 18, as shown in Figs. 8 and 10, and normally serves to force the plate 28 outwardly to the position shown in Fig. 8, in which position the rollers 31 will be disengaged from said plate and will lockingly engage the plates 36 and inclines 34, through the intermediacy of the spring channel plate 35.

As shown in Fig. 4, the cover plate 26, at its key hole end, is provided with an inwardly extending projection 38, which is disposed between the adjacent plate 10 and the plate 6. The other end of the plate 26, is provided with an inwardly extending projection 39. A flat transverse tie bar 40 extends between the projection 39 and two end arms 41, provided on the adjacent plate 10, for holding the adjacent end of the cover plate 26 in position.

In the operation of my invention, the key 20, is inserted in the key-hole 25 and slot 19, and forced inwardly to the position shown in Fig. 10. It will bear against the portion 29 of the plate 28 and will thus force the plate 28 inwardly to a position in which the cam portions 30 will engage the rollers 31 and force them outwardly from the locking position. If the key 20 be now turned, it will, as described, cause the leaf holding members, 1 and 2, to be moved away from each other. In the meantime, the guard comprising the adjacent end of the cover plate 26, will, by reason of its being in the notch 27 of the key 20, prevent the spring 37 from forcing the plate 28 to the released position, shown in Fig. 8, until the key has been again returned to the initial position, shown in Fig. 8. Suitably perforated loose leaves 42, may now be placed upon or removed from the posts 3, and tubes 4. When it is desired to contract the book, the key 20 is turned to the position shown in Fig. 10, which may be done without turning the pinions 13, as the projection 21 will be rotated away from the projection 22. When the key is in the position shown in Fig. 10, the spring 37 will force the plate 28 and key 20 to the inoperative position, upon which the spring plate 35 will force the roller wedges 31 into the locking position shown in Figs. 8 and 9. The members 1 and 2, may now be forced toward each other until they tightly clamp the leaves 42, but they cannot again be moved to the expanded position without being actuated by the key, in the manner hereinbefore described.

I do not limit my invention to the structure shown and described, as modifications, within the scope of the appended claims, may be made without departing from the spirit of my invention.

Having thus described my invention, what I claim and desire to secure by Letters Patent, is:—

1. In a loose leaf holder, a laterally movable leaf holding member, manually operated actuating means for moving said member in one direction, means including a wedge for normally holding said member from moving in said direction, and means for releasing said wedge.

2. In a loose leaf holder, a laterally movable leaf holding member, manually operated actuating means for moving said member in one direction, locking means including a roller wedge, for normally holding said member from moving in said direction, and means for releasing said roller wedge.

3. In a loose leaf holder, a laterally movable leaf holding member, actuating means for moving said member in one direction, means including a wedge for normally holding said member from moving in said direction, means for releasing said wedge, and means for operating said releasing means and said actuating means.

4. In a loose leaf holder, a laterally movable leaf holding member, actuating means for moving said member in one direction, means including a roller wedge for normally holding said member from moving in said direction, means for releasing said roller wedge, and means for operating said releasing means and said actuating means.

5. In a loose leaf holder, a laterally movable leaf holding member, a rotary member, means actuated by the rotary member for moving the leaf holding member in one direction, locking means including a wedge, for normally holding the leaf holding member from moving in said direction, means for releasing said wedge, and joint means for operating the releasing means and said rotary member.

6. In a loose leaf holder, two leaf holding members movable toward and from each other, two rack members movable respectively with said leaf holding members, a pinion engaging said rack members, a second pinion engaging one of said rack members, and means for rotating said second pinion.

7. In a loose leaf holder, two leaf holding members movable toward and from each other, manually operated means for moving said members with respect to each other, locking means including a wedge for normally holding said members from moving apart, and means for releasing said locking means.

8. In a loose leaf holder, two leaf holding members movable toward and from each other, actuating means for relatively moving said members, locking means including a wedge for normally holding said members from moving apart, means for releasing said locking means, and joint means for operating said releasing means and said actuating means.

9. In a loose leaf holder, a laterally movable leaf holding member, key actuated means for moving said member in one direction, and releasable locking means including a wedge for normally holding said member from moving in said direction.

10. In a loose leaf holder, a laterally movable leaf holding member, manually operated actuating means for moving said member in one direction, and locking means including a releasable wedge for normally holding said member from moving in said direction.

11. In a loose leaf holder, a laterally movable leaf holding member, means adapted to operate on and move said member in either of two directions, locking means including a wedge for normally holding said member from moving in one direction, and key actuated means for releasing said locking means.

12. In a loose leaf holder, a laterally movable leaf holding member, actuating means for moving said member in one direction, locking means including a wedge for normally holding said member from moving in said direction, and means for releasing said locking means, the actuating means and releasing means being adapted to be operated by a key.

13. In a loose leaf holder, two leaf holding members movable relatively to each other, actuating means for so moving said members, locking means including a wedge for normally holding said members from moving apart, and means for releasing said locking means, the actuating means and releasing means being adapted to be operated by a key.

14. In a loose leaf holder, a laterally movable leaf holding member, a rack movable therewith, a rotary pinion engaging said rack for moving said rack and leaf holding member, and releasable means including a roller wedge for locking said member from moving in one direction.

15. In a loose leaf holder, a laterally movable leaf holding member, a rack movable therewith, a rotary pinion engaging said rack for moving the rack and said member, and releasable means, including a wedge, for normally holding said member from moving in one direction.

16. In a loose leaf holder, a laterally movable leaf holding member, a rack movable therewith, a rotary actuating pinion engaging said rack, locking means, including a wedge, for normally holding said member from moving in one direction, and means for releasing said locking means.

17. In a loose leaf holder, a laterally movable leaf holding member, a rack movable therewith, a rotary actuating pinion engaging said rack, locking means including a wedge for normally holding said member from moving in one direction, means for releasing said locking means, and means for operating said releasing means and for turning said pinion.

18. In a loose leaf holder, a laterally movable leaf holding member, key actuated means including a rack and pinion for moving said member, means including a wedge for locking said member from moving in one direction, and key actuated means for releasing said locking means.

19. In a loose leaf holder, two leaf holding members movable relatively to each other, two racks movable respectively therewith, a pinion engaging said racks, locking means including a roller wedge for holding said members from moving apart, and means for releasing said locking means.

20. In a loose leaf holder, two leaf holding members movable relatively to each other, two racks movable respectively therewith, a pinion engaging said racks, and releasable locking means, including a wedge, for holding said members from moving apart.

21. In a loose leaf holder, two leaf holding members movable relatively to each other, two racks movable respectively therewith, a pinion engaging said racks, locking means including a roller wedge for holding said members from moving apart, and key-actuated means for releasing said locking means.

22. In a loose leaf holder, two leaf holding members movable relatively to each other, two racks movable respectively therewith, a pinion engaging said racks, locking means, including a wedge, for holding said members from moving apart, and means for releasing said locking means.

23. In a loose leaf holder, two leaf holding members movable relatively to each other, two racks movable respectively therewith, a pinion engaging said racks, locking means including a wedge for holding said members from moving apart, means for releasing said locking means and adapted to be actuated by a key, and means adapted to be actuated by a key for moving one of said leaf holding members relatively to the other.

24. In a loose leaf holder, two leaf holding members movable relatively to each other, two racks movable respectively therewith, a pinion engaging said racks, locking means, including a wedge, for holding said members from moving apart, key actuated means for releasing said locking means, and key actuated means for moving one of said leaf holding members relatively to the other.

25. In a loose leaf holder, two leaf holding members movable relatively to each other, two racks movable respectively therewith, a pinion engaging said racks, an actuating pinion, means operated by the actuating pinion for moving one of said leaf holding members, a support for said pinions, and key actuated means for turning the actuating pinion.

26. In a loose leaf holder, two leaf holding members movable relatively to each other, two racks movable respectively therewith, a pinion engaging said racks, releasable locking means including a wedge for holding said members from moving apart, and key actuated means for moving one of said members relatively to the other.

27. In a loose leaf holder, two leaf holding members, movable relatively to each other, two racks movable respectively therewith, a pinion engaging said racks, an actuating pinion, means operated by the actuating pinion for moving one of said members relatively to the other, releasable locking means including a wedge for holding said members from moving apart, and key actuated means for turning said actuating pinion.

28. In a loose leaf holder, two leaf holding members movable relatively to each other, two racks movable respectively therewith, a pinion engaging said racks, an actuating pinion, a support for said pinions, means operated by the actuating pinion for moving one of said leaf holding members, key actuated means for turning the actuating pinion, locking means including a wedge for holding said members from moving apart, and key actuated means for releasing said locking means.

29. In a loose leaf holder, a laterally movable leaf holding member, locking means for normally holding said member from moving in one direction, a key actuated device, which, when moved to a pre-determined position, releases said locking means, and yielding means for retracting said device from said position.

30. In a loose leaf holder, a laterally movable leaf holding member, locking means for normally holding said member from moving in one direction, a key actuated slidable member for releasing said locking means, and yielding means for normally resisting movement of said slidable member to the operative position.

31. In a loose leaf holder, a laterally movable leaf holding member, locking means for normally holding said member from moving in one direction, a device which, when moved to a pre-determined position, releases said locking means, a key for moving said device to said position, and a spring for retracting said device from said position.

32. In a loose leaf holder, a laterally movable leaf holding member, locking means for normally holding said member from moving in one direction, a device movable to and from a position in which it will release said locking means, a key for moving said device to said position, and a guard for engaging said key and holding it in the operative position, when the key has moved said device to the operative position and the key has been turned from its position of insertion.

33. In a loose leaf holder, a laterally movable leaf holding member, locking means for normally holding said member from moving in one direction, a device movable to and from a position in which it will release said locking means, yielding means for resisting movement of said device to said position, a key for moving said device to said position, and a guard for holding the key in said operative position when the key has moved said device to said position and the key has been turned from its position of insertion.

34. In a loose leaf holder, a laterally movable leaf holding member, actuating means for moving said member in one direction, locking means including a wedge for normally holding said member from moving in said direction, the actuating means being adapted to be operated by a key, and means for releasing said locking means.

35. In a loose leaf holder, a stationary back member, two leaf holding members movable toward and apart from each other, releasable locking means including a wedge for locking the leaf holding members to the back member, and means for moving the leaf holding members relatively to the back member.

36. In a loose leaf holder, a stationary back member, two leaf holding members movable toward and from each other, releasable locking means including a wedge for locking the leaf holding members to the back member, actuating means for moving the leaf holding members relative to the back member, and a key for operating the locking means and the actuating means.

37. In a loose leaf holder, a laterally movable leaf holding member, locking means including a wedge for holding said member from moving laterally in one direction, a spring for normally forcing the wedge to the locking position, key operated means for moving the leaf holding member laterally, and key operated means for releasing said wedge.

38. In a loose leaf holder, a movable leaf holding member, actuating means adapted to operate on and move said member in either of two directions, means including a roller wedge for holding said member from moving in one direction, and key actuated means for releasing said wedge.

39. In a loose leaf holder, a movable leaf holding member, key actuated means for moving said member in one direction, means including a roller wedge for holding said member from moving in said direction, and means for releasing said wedge.

40. In a loose leaf holder, a movable leaf holding member, manually operated means for moving said member in one direction, and releasable means, including a wedge, for holding said member from moving in said direction.

41. In a loose leaf holder, a movable leaf holding member, means for moving said member in opposite directions, and releasable means, including a wedge, for holding said member from moving in one of said directions.

42. In a loose leaf holder, two movable leaf holding members, a stationary back member having an inclined abutment, a wedge for engaging said inclined abutment and one of said leaf holding members, for holding the said one of said leaf holding members from moving in one direction, means for normally holding said wedge in contact with said abutment, means for releasing said wedge, and means for moving the leaf holding members in said directions.

43. In a loose leaf holder, a leaf holding member, means actuated by a key for moving said member in one direction, releasable means including a wedge for locking said member from movement in said direction, a member movable by a key to a position in which it will release said wedge, and means for normally retracting said releasing member from said position.

44. In a loose leaf holder, a leaf holding member, releasable means including a wedge for holding said member from movement in one direction, means adapted to operate on and move said member in either of two directions, a member movable to a position in which it will release said wedge, and yielding means for normally retracting said releasing member from said position.

In testimony whereof I have signed my name to this specification in presence of two subscribing witnesses.

WILLIAM P. PITT.

Witnesses:
KEARNEY L. KELLEY,
E. B. HOUSE.